March 17, 1964  D. B. PALL ETAL  3,124,959
PRIMARY DIFFERENTIAL PRESSURE SENSING
ELEMENTS AND TRANSDUCERS
Filed July 19, 1960  2 Sheets-Sheet 1

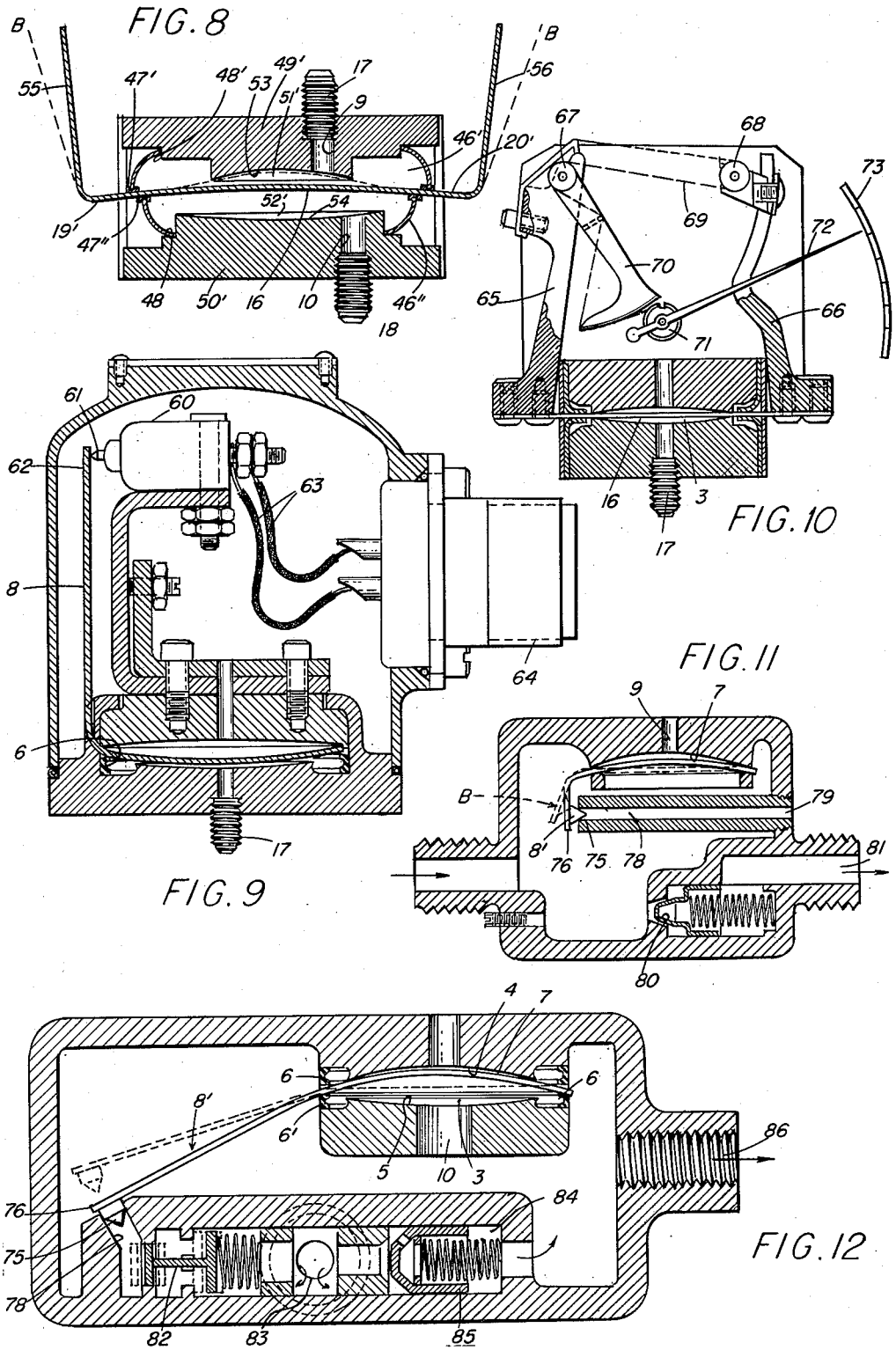

United States Patent Office

3,124,959
Patented Mar. 17, 1964

3,124,959
PRIMARY DIFFERENTIAL PRESSURE SENSING
ELEMENTS AND TRANSDUCERS
David B. Pall, Roslyn Heights, and Mathias P. L. Siebel, Glen Cove, N.Y., assignors to Pall Corporation, Glen Cove, N.Y., a corporation of New York
Filed July 19, 1960, Ser. No. 43,913
9 Claims. (Cl. 73—407)

This invention relates to primary differential pressure sensing elements useful as pressure indicators and as transducers, and, more particularly, to primary differential pressure sensing elements wherein the difference in pressure between two fluids or a single fluid in separate systems or in different parts of the same system appears as the angular movement of a sensing means corresponding to the pressure-responsive deflection of a diaphragm.

The use in pressure measuring devices of diaphragms responsive to pressure differentials is very old. Pressure cells in which a central chamber is divided by a diaphragm into two portions open to variable pressure fluid are shown, for example, as early as U.S. Patent No. 45,247 of 1864. The diaphragm deflects when the pressure on one side is greater than the pressure on the other, and the pressure differential is observed from movement of a sensing element in contact with a central portion of the diaphragm. Diaphragms of all types have been employed, ranging from very resilient materials, such as rubber, to relatively stiff but flexible thin metal sheets.

One of the serious problems in diaphragm pressure cells of this type has been the construction of the mechanism so that the deflection of the diaphragm will accurately respond to changes in pressure, and the sensing element will detect this response without introducing a material error. Additional problems are presented by proper support of the diaphragm in the cell, so that accurate deflection can take place without leakage of fluid around the diaphragm. The art has tackled each of these problems, and many variations of diaphragm pressure cells are now known.

The early U.S. patents, such as Nos. 45,247, 210,179, 874,517, 1,330,513 and 1,412,698, employ flexible nonmetallic diaphragm materials. One of the first U.S. patents to mention a metal diaphragm is No. 1,732,052. Other patents employing what appear to be metallic diaphragms are Nos. 2,551,489, 2,749,744 and 2,697,352. Movement of the central portion of the diaphragm also can be employed to actuate a mechanical or electrical signal, the signal in most cases being actuated only when the diaphragm has flexed to a predetermined position. Exemplary of this type of system are U.S. Patents Nos. 2,641,131, 2,645,949, 2,667,786 and 2,712,601. In all of the systems presented to date, however, the accuracy of the response to a small difference in pressure at high absolute pressures has left much to be desired.

In order to obtain as much accuracy as possible, the sensing means has been positioned at the center or approximately the center of the diaphragm, where the deflection is the greatest. Such a construction translates movement of the diaphragm directly into reciprocating motion of the sensing means, which is then employed to actuate a signal. The need to permit reciprocating motion of the sensing means introduces problems.

At high fluid pressures, leakage problems introduced by difficulty in sealing the diaphragm and sensing element in the pressure cell chamber may become severe. The diaphragm has to be sealed in such a way as to permit deflective movement of a central portion. Since the sensing means is associated with a central portion of the diaphragm and responds to movement thereof, which movement is transmitted thereby to a point outside the pressure chamber, it is necessary to provide for movement of the sensing means through the pressure chamber wall, and this requires leakproof sealing, while at the same time not unduly interfering with free movement of the sensing means. Only an elastic or moving seal can be used for this purpose. Although both seals present problems, sealing the sensing means is the most serious, and is almost impossible to accomplish at high internal pressures.

In accordance with the instant invention, these problems are avoided by providing a sensing means which directly translates deflective movement of the diaphragm into angular motion externally of the pressure chamber, which motion can be made to be proportional to the amount of deflection, and is capable of multiplication by a suitable mechanism. The sensing means of the invention is associated with an edge portion of the diaphragm, and extends therefrom. The further the sensing means extends from the diaphragm, the greater the arc length through which the end thereof moves with a given angular deflection of the edge portion of the diaphragm. Thus, this sensing means is itself a multiplier or amplifier of the diaphragm's deflection, which a reciprocating sensing means cannot be.

The sensing means can be connected with indicating means or with signal-transmitting means, which means can be any of the conventional types known to the art. In this way, any desired response can be obtained following deflection of the diaphragm in reaction to a given pressure thereon. Thus, the device is capable of use as a pressure indicator, or as a transducer to effect electrical or mechanical actions of all kinds, in response to actuation by a change in differential pressure in the system with which it is connected. By way of measuring changes in differential pressure, other changes such as changes in temperature can be measured indirectly.

By associating the sensing means with an edge portion of the diaphragm, the necessity for separate sealing of this means can be avoided, and only a single seal will serve both diaphragm and sensing means.

The primary differential pressure sensing element of the invention essentially comprises a chamber, referred to herein as a pressure chamber, across one side of which is a pressure-sensitive diaphragm. In most instances, it will be found convenient to have chambers on each side of the diaphragm, such as by providing a pressure chamber which is partitioned into two separate portions by the diaphragm. Whether one or two chambers are provided, the two sides of the diaphragm are exposed to the pressure fluids between which the pressure differential, referred to herein as $\Delta p$, is to be detected. When the sensing element is to be used as a pressure indicator, giving the pressure differential relative to atmospheric pressure, i.e., gauge pressure, one side of the diaphragm is exposed to the atmosphere. For use in measuring absolute pressure, one side of the diaphragm is exposed to a vacuum. When used as a differential pressure indicator in a fluid system, both sides of the diaphragm are exposed to the fluid in the two portions of the system between which the differential pressure is being measured, such as across a filter. For use to measure differential pressure between two systems, one side is exposed to fluid from one system, and the other to the remaining system.

The diaphragm is supported at a point adjacent an edge thereof for deflection of a central portion accompanied by angular movement of an edge portion responsive to differences in pressure between the two portions of the chamber. Extending from the diaphragm at a point adjacent an edge thereof is the sensing means, which translates pressure-responsive deflection of the central portion of the diaphragm into angular motion. Thus, the differential pressure between the two portions of the chamber can be read directly from the angular movement of the sensing means. In a simple form of device, the sensing means acts as a pointer, moving across a scale, from which the angle of deflection of the edge of the diaphragm is read directly. Other more complex forms are illustrated in the more detailed description which follows.

The diaphragm can be of any flexible and elastic material, preferably with a linear stress-strain relationship, including metals and plastics, such as polystyrene, cellulose acetate propionate, urea-formaldehyde resins, and polyamides, steel alloys, heat-treated precipitation-hardenable steel and stainless alloys, beryllium-copper and nickel-iron alloys of low temperature coefficient of elastic modulus, all of which are in the form of a sheet thin enough to give adequate deflection under the use conditions of the sensing element. Usually, a thickness of from about 0.03 to about 0.1 inch is satisfactory. The ratio of the radius to the thickness $R/T$ of the diaphragm ranges from about 8 to about 30.

The remainder of the sensing element can be of the same material as the diaphragm, or of any other material suitable for its construction, such as iron, aluminum, magnesium, phenol-formaldehyde resins, and polytetrafluoroethylene, depending on the requirements of the system in which it is to be used.

Any walls of the pressure chamber to which the diaphragm is bonded will be thin enough to allow the edge of the diaphragm to deflect when necessary. Usually, such walls will not exceed ¼ the thickness of the diaphragm, and will range from about 0.004 to about 0.02 inch in thickness. Additional supporting or reinforcing walls may be required for the pressure chamber, to enable it to withstand high external or internal pressures; the thickness of these is not critical, provided they do not obstruct deflection of the edge of the diaphragm.

The pressure chamber need not be large. It should provide sufficient clearance to permit deflection of the diaphragm to the desired degree. Desirably, but not necessarily, the chamber caps are close enough to the diaphragm to prevent its deflection beyond the desired limit, to prevent overstressing, and they are contoured to conform to the shape of the diaphragm at its deflection limit. Usually, to prevent overstressing, the distance from the diaphragm, as normally flat, to the chamber cap will not exceed ½, and preferably will not exceed ⅙, of its thickness.

In view of these small dimensions, it is frequently desirable to protect the pressure chamber from entry of dirt and other foreign matter that would obstruct deflection of the diaphragm. For this purpose, a filter element can be provided. Wire mesh such as is described in U.S. Patent No. 2,925,650, and sintered stainless steel such as is described in U.S. Patent No. 2,554,343 are quite satisfactory. Microporous synthetic resin membranes, such as polyamide and nitrocellulose membranes, filter paper, open mesh fabrics such as glass fiber and nylon mesh, and fiber bats such as glass wool are also satisfactory.

It will be evident that at such deflections, the angle of deflection or rotation of the diaphragm edge to the normal in the plane of the diaphragm will range from about ½° to about 5°. There will also be a small accompanying translational movement, in many cases, with movement of the wall, and depending in magnitude upon the thickness and flexibility of the wall, ranging from 0 up to about 0.01 inch. Thus, a sensing means attached at an edge of the diaphragm will have an angular movement through a distance X which is a function of the angle of rotation plus the distance of translation. A sensing means attached at an angle to the diaphragm will move a distance Y which a function of the angle of rotation, and the translational movement can be removed as a factor to be taken into account by a suitable design of the mechanism.

The sensing means is attached to an edge portion of the diaphragm, and has a width which is sufficiently low so as to not interfere with deflection of a central portion of the diaphragm. It preferably is integral therewith, and extends directly from an edge thereof, but it can also be attached to or near the edge. The arc length at any point is the product of the angle of rotation of the diaphragm edge and its distance from the center of rotation, so that it can give good amplification of the deflection.

The sensing means can be all in one piece, or it can be in sections removably coupled together so as to facilitate removal of the sensing element for servicing. The sensing means can extend entirely in the plane of the diaphragm, or can be bent at any desired angle thereto for conversion of angular movement thereof into reciprocating movement. A pair of sensing means bent parallel to each other and extending from opposite sides of the diaphragm provide by movement of their ends a convenient multiplication of the diaphragm deflection, in the form of reciprocating instead of angular motion.

A readily adaptable form of sensing means is an arm integral with and extending from an edge of the diaphragm. Such an arm can be arranged to connect with supplemental amplifying means such as tapes and reciprocating means for further amplification, if desired, as will appear from the following description.

The diaphragm can be predeflected or dished against the direction of the greater pressure to be exerted thereon, so as to allow a greater deflection range. The caps of the pressure chamber opposite the diaphragm can be contoured to receive and limit the deflection of the diaphragm upon response to a change in pressure. This prevents damage from over-pressuring.

A contoured diaphragm can be used to increase resistance to high differential pressures. The contour is such as to give as uniform a stress level as possible over the whole surface. Higher angular deflections are then obtained, than would be for a diaphragm of uniform thickness adequate to withstand the pressure.

A diaphragm of uniform thickness will respond very nearly linearly at deflections less than approximately one quarter of its thickness or half its thickness, in the case of a predeflected or dished diaphragm. Nonlinearity can be minimized by making the diaphragm thicker at the center than at the edges, such as by attaching a central disk to the diaphragm or by decreasing the thickness gradually and uniformly from the center to the edges. However, a nonlinear response may be desirable in many cases, such as for use with an orifice flowmeter.

The diaphragm can be supported in the pressure chamber in a number of ways, and the type of construction employed will depend upon the magnitudes of the internal pressures and the pressure differentials to be encountered. The supporting construction must be leakproof under the use conditions.

The diaphragm can be supported by sealing elements of a conventional type, such as O-ring and V-ring seals. V-ring seals of the type described in copending application Serial No. 835,910, filed August 25, 1959, are particularly advantageous. Such seals are made with flanges extending V-wise from a base portion, all made of metal such as stainless steel, and may have a resilient core of plastic such as rubber. The core can be omitted in the sensing elements of the invention, when used at low pressures.

A seal of this type has the advantage that the device can be taken apart for servicing. Where this is not important, the sealing element can be dispensed with, and the diaphragm bonded to the sealing element or to the chamber wall. The bonding desirably is effected by brazing, welding, fusing, soldering, or sintering, as appropriate to the need. The diaphragm can, for example, be bonded in a radial plane in a tube, dividing it into two parts, at least one of which is then enclosed with a cap having a passage therethrough, forming a pressure chamber on at least one side of the diaphragm between it and the cap. The sensing means then is bonded to the outside of the tube opposite the edge of the diaphragm.

This type of construction is absolutely leakproof, but it requires a thin-walled tube, since the tube wall must bend with the deflection of the diaphragm, and the edges of the diaphragm must be only very lightly constrained. This makes the construction subject to failure at high pressures.

In order to furnish similar support for the edge of the diaphragm but to allow the thin walls of the tube to support much higher pressures, another type of seal can be used. For example, cup-shaped walls can be fitted with the diaphragm bonded at either end of the cup, and the other end of the cup bonded to a cap. The sensing means can be integral with the diaphragm, if desired. The caps must be rigidly held at a predetermined distance from the diaphragm and each other by means of an external structure. This type of construction is leakproof, and can be designed to operate accurately at internal pressures higher than 10,000 p.s.i. and more without failure, at appropriate thicknesses of diaphragm and walls.

This type of construction makes it possible to use metallic bonds, thus extending temperature limitations on use to the softening or melting point of the lowest softening metal present. It is also possible, using metals or synthetic moldable resinous and cellulosic materials, to mold or cast one-piece sensing elements including all parts as one integral whole. This makes manufacture on a large scale inexpensive and rapid, and the devices thus produced will be uniform in pressure response.

The area of the diaphragm exposed on each side to the pressure chambers in most sensing elements of the invention will be the same, equalizing the deflection forces at zero pressure differential. However, these areas can be different so as to produce a couple to turn the edge of the diaphragm, to give a deflection thereof, at zero pressure differential, from the side of greater area to the side of lesser area.

The drawings illustrate preferred embodiments of primary differential pressure sensing elements, as well as systems in which such elements are used illustratively as pressure indicators, and electrical and mechanical transducers.

FIGURE 8 is a detailed view of another embodiment of sensing element having a diaphragm whose exposed surfaces have different areas.

FIGURE 9 is a cross-sectional view of a differential pressure transducer employing the sensing element of the invention to actuate an electric switch.

FIGURE 10 is a cross-sectional view of a differential pressure transducer in which the sensing element is employed to operate a pointer to indicate differential pressure.

FIGURE 11 is a cross-sectional view of a differential pressure transducer wherein the sensing element operates a whistle signal.

FIGURE 12 is a cross-sectional view of a differential pressure transducer wherein the sensing element operates a pressure regulator.

In the following discussion of the drawings, a given part where it appears in different figures is referred to by the same number.

Figure 1:
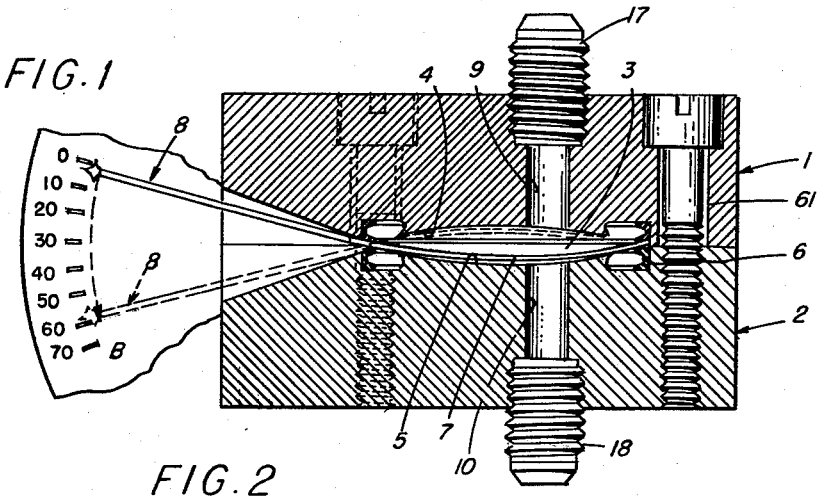
FIGURE 1 is a cross-sectional view of a primary differential pressure sensing element having a single sensing means.

The primary differential pressure sensing element of FIGURE 1 comprises a pair of steel blocks or caps 1 and 2 held together by any desired manner, such as clamps or screws (not shown) and having a chamber 3 therein which has spherically shaped top and bottom walls 4 and 5. Supported upon V-ring seals 6 is a flexible stainless steel diaphragm 7, and extending from one edge of the diaphragm 7 is the sensing means, in the form of an arm 8. The diaphragm is normally, bowed, as shown, against the wall 5 of chamber 3. Each of the blocks is provided with passages 9 and 10 and pressure nipples 17 and 18 for entry of pressure fluid to the chamber 3.

In operation, an increase in pressure in the lower portion of chamber 3, exceeding a predetermined minimum, deflects the diaphragm from its bowed position, and eventually, at a sufficient pressure, into the ultimate position B shown by the dotted lines, where it is stopped by upper wall 4. As the diaphragm 7 flexes upwardly, there is a corresponding movement of the arm 8, ultimately into position B. The arm thus converts the flexing movement of the diaphragm into angular motion, and the relative movement of the diaphragm can be read directly on the scale from the position of the arm 8. By appropriate arrangement, as shown illustratively in FIGURES 9, 10, 11 and 12, movement of the arm 8 could be made to actuate a signal.

Figure 2:
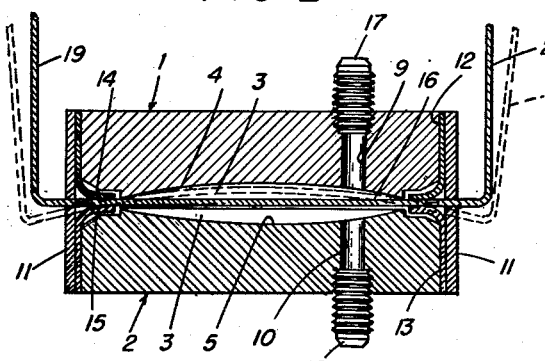
FIGURE 2 is another embodiment of a primary differential pressure sensing elements having a pair of sensing means and in which the diaphragm is supported between cups.

The primary differential pressure sensing element of FIGURE 2 comprises a tube 11 in which is inserted a pair of cylindrical cups 12 and 13 attached by a brazed joint or similar strong metallic or other bond at their base portions 14 and 15 and supporting therebetween the elastic pressure sensitive strainless steel diaphragm 16. Fitted into the cups 12 and 13 are blocks or caps 1 and 2, each provided with passages 9 and 10 at one side for passage of the variable pressure fluid into the chamber 3. The upper and lower faces 4 and 5 of the caps defining the chamber 3 and facing the diaphragm are curved to correspond to the bow of the diaphragm when deflected in response to pressure changes, and the caps also act as a stop limiting the maximum flexure of the diaphragm under stress. The passages 9 and 10 in the caps or blocks are provided with pressure nipples 17 and 18, and can be provided with filters (not shown) to prevent the entry into the chamber 3 of dirt and other foreign matter, which would obstruct movement of the diaphragm 16.

Integral with and extending from the edge of the diaphragm 16 in its plane are a pair of arms 19 and 20, which constitute the sensing means. The ends of the arms are bent upwardly at 90° to the diaphragm. They then translate angular deflection of the edge portion of the diaphragm into reciprocating motion at their ends.

Figure 3:
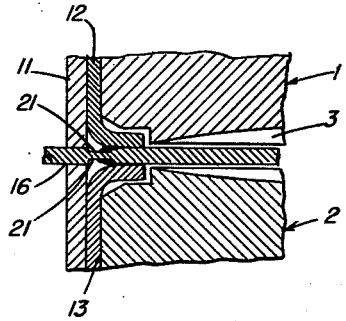
FIGURE 3 is a detailed view of the means of attachment of the diaphragm in the element of FIGURE 2.

As best seen in FIGURE 3, the step 21 prevents running of braze to form an uneven and uncontrollable fillet at the joint of the members 14 and 15 to the diaphragm 16.

In operation, the two portions of the chamber are connected, for example, at different portions of a fluid system, such as across a filter. Upon an increase in pressure before the filter, reflected via passage 10 in the lower portion of the chamber 3, the diaphragm 16 responds by becoming bowed upwardly, into the position B shown in the dotted lines, whereupon the arms 19 and 20 are moved outwardly. An appropriate signal can be actuated by the ends of the arms, as shown, for instance in FIGURES 9, 10, 11 and 12.

Figure 4:
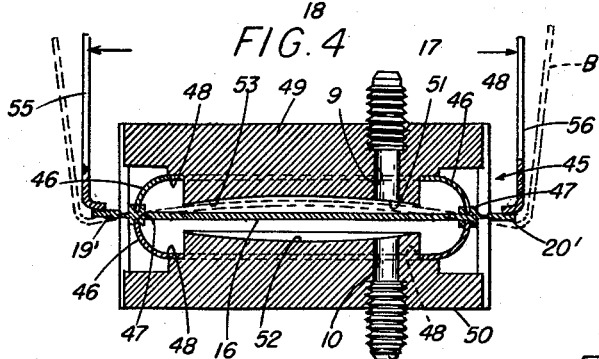
FIGURE 4 is a cross-sectional view of a primary differential pressure sensing element in which the diaphragm is supported between inverted cups.

The primary differential pressure sensing element of FIGURE 4 represents a modification of FIGURE 2 and made of the same materials, in which the diaphragm is supported between inverted cups 46, the cylindrical parts of which are seated at 47, at each face of the diaphragm, and the plane parts of which are seated at steps 48 in the caps 49 and 50 which close off the top and bottom of the tube 45. The caps are so fitted as to define open spaces or chambers 51 and 52 between the face of the diaphragm and their contoured inside faces 53 and 54. The caps have passages 9 and 10 therethrough for entry of fluid into these chambers.

Integral with the diaphragm 16 are two-piece arms 19' and 20' which translate deflection of the diaphragm into angular motion, the ends thereof 55 and 56 translating the angular movement of the arms 19' and 20' into reciprocating motion.

In operation, an increased fluid pressure applied in chamber 52 causes the diaphragm to deflect upwardly, as shown in dotted lines, to position B, producing a corresponding movement in the arm end portions. This movement can be used to actuate a signal, as shown in any of the transducers described hereinafter in FIGURES 9, 10, 11 and 12.

Figure 5:
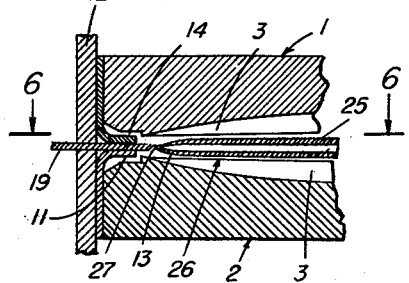
FIGURE 5 is a detailed view of another type of diaphragm useful in the sensing elements of the invention, shown particularly in the device of FIGURE 2.
Figure 6:
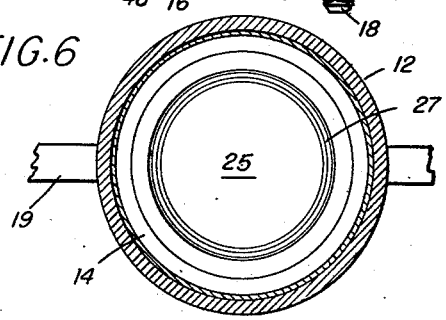
FIGURE 6 is a top view of the diaphragm of FIGURE 5.

FIGURES 5 and 6 show an embodiment of the device of FIGURE 2 and made of the same materials, wherein a disk 25 of smaller diameter is attached to the center of the diaphragm 26, which is grooved at a point 27 beyond the periphery of the disk, so that the diaphragm has a greater thickness at the center than at the edges adjacent the support, and deflects preferentially at the groove. This type of construction prevents excessive deflection of the center of the diaphragm and thus increases the range of linear response of the diaphragm to pressure changes.

Figure 7:
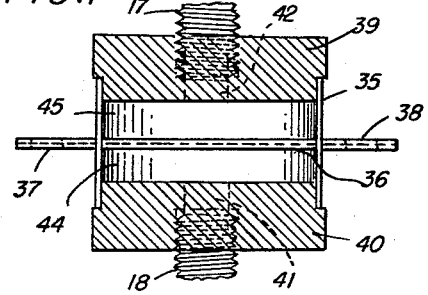
FIGURE 7 is a cross-sectional view of another form of primary differential pressure sensing element in accordance with the invention, in which the diaphragm is supported in a tube.

The primary differential pressure sensing element of FIGURE 7 employs a thin-walled tube 35. An elastic stainless steel diaphragm 36 is bonded, such as brazed, in place within the tube, or made integral with the tube. Bonded to or integral with the outside of the tube directly opposite the edges of the diaphragm are a pair of arms 37 and 38, and fitted into the top and bottom of the tube 35 are two cap inserts 39 and 40, each containing passages 41 and 42 for entry of pressure fluid into the chambers 43 and 44 defined between the inside faces of the caps and the diaphragm. The diaphragm and the tube walls are both of flexible material, so that deflection of the diaphragm bends the tube wall, and with it angularly moves the arms 37 and 38.

In operation, application of greater pressure on either side of the diaphragm causes it to deflect towards the lesser pressure. This movement of the diaphragm results in a corresponding angular movement of the diaphragm edges at the tube wall, and of the arms. The arms can be employed to operate a signal, as indicated in FIGURES 9, 10, 11 and 12, for example.

The primary differential pressure sensing element of FIGURE 8 represents a modification of that of FIGURE 4 and made of the same materials, so as to have different areas of exposed surface on the two sides of the diaphragm 16. The diaphragm is supported between inverted cups 46' and 46", the cylindrical parts of which are seated at 47' and 47", and the plane parts of which are seated in the indentations 48' in the insert caps 49' and 50' which close off the top and bottom of the tube 45. The caps are so fitted as to define open spaces or chambers 51' and 52' between the face of the diaphragm and their contoured inside faces 53 and 54. The caps have passages 9 and 10 therethrough for entry of fluid into these chambers, fitted with nipples 17 and 18.

Integral with the diaphragm 16 are two-piece lever arms 19' and 20' which translate deflection of the diaphragm into angular motion, the ends thereof 55 and 56 translating the angular movement of the arms 19' and 20' into reciprocating motion.

In operation, at zero differential pressure the diaphragm is deflected upwardly, and the end portions 55 and 56 outwardly, due to the difference in area exposed to fluid pressure in chambers 51' and 52'. An increased fluid pressure applied in chamber 52' causes the diaphragm to deflect upwardly still further, as shown in dotted lines, to position B, producing a corresponding movement in the arm end portions. This movement can be used to actuate a signal, as shown in any of the transducers described hereinafter in FIGURES 9, 10, 11 and 12.

FIGURE 9 represents one way of employing the primary differential pressure sensing element of FIGURE 1 as a transducer. The single arm 8 is turned at 90° to the diaphragm and extended to a point adjacent an electric push-button switch 60. In the normal position, as shown, the push-button 61 of the switch is held in place by the end 62 of the arm 8. Upon deflection of the diaphragm upwardly, in response to a change in pressure in the chamber 3, the arm moves outwardly, releasing the push-button 61, and triggering the switch. The switch is connected by wires 63 to the electrical system 64, and can be arranged either to open or to close a circuit upon actuation, as desired. Upon release of the pressure condition, the arm 8 returns to normal position, and the switch is then closed or opened, as arranged for.

FIGURE 10 represents a differential pressure transducer wherein the sensing element is used to operate a pointer, as in a pressure gauge. This type of transducer employs the sensing element of FIGURE 2. The arms 65 and 66 in this case are equipped with pulleys 67 and 68, and a tape 69. Pulley 68 is fixed directly to arm 66, and pulley 67 to a sector 70 pivotally attached to the arm 68. The tape 69 is threaded around the pulleys between the two arms, and around pins and slots in the sector 70. One end of the tape is attached to arm 67, and the other attached, after having been looped one full turn, to the spring-biased pulley 71, to which is also attached a pointer 72 superimposed upon a scale 73 in conventional fashion. The pulley 71 is spring-mounted to maintain tension in the tape.

This gauge can be used as a pressure gauge if the upper portion of chamber 3 is open to the atmosphere, and the lower portion of the chamber to the source of variable pressure fluid. An increase or decrease in pressure in the lower portion of the chamber results in a corresponding deflection of the diaphragm 16, correspondingly moving the arms 65 and 66 outwardly or inwardly, and thus moving the tape and pointer. If the arms move inwardly, the slack introduced in the tape is taken up by rotation of the spring-mounted pulley 71, rolling up the tape on the pulley, and the pointer moves in one direction on the scale. If the arms move outwardly, tape is unwound from roll 71, and the pointer moves in the other direction. This movement of the pointer is in direct proportion to the deflection of the diaphragm, but the pointer moves a greater distance than the actual movement of the arms because of the multiplying effect of the tape and pulleys, and this is of course superimposed upon the multiplying effect by the arms of the deflection of the diaphragm.

This device could also be used to give a reading of absolute pressure by evacuation of one side of chamber 3. Furthermore, temperature differentials between fluids at different points in a system or in two systems can be determined by measuring the pressure differential, using this device.

FIGURE 11 represents a primary differential pressure sensing transducer in which the sensing element is used as an actuator to operate a whistle signal. This device employs a sensing element similar to that in FIGURE 1, with the single arm 8' in this instance having a valve member 75 attached to its end 76. One side of the diaphragm is open to the atmosphere via line 9, and the other to gas in a closed system in line 10. The valve member closes a line 78 to a whistle 79.

In normal operation, while the internal pressure is high, the diaphragm 7 is bowed as shown, and the valve is closed. The gas then passes through the pressure regulator 80 to the outlet 81. When the pressure decreases below a certain minimum, the diaphragm 7 resumes its flat position, causing movement of the arm 8 to position B, shown in dotted lines, and permitting gas under pressure to enter the line 78, thus sounding the whistle 79.

This type of device is particularly advantageous to give an audible warning when, for example, there is a loss in pressure due to the exhaustion of the gas supply in therapeutic treatment, or to the escaping of a poisonous gas from a line, in a chemical plant, so that the factory can be evacuated speedily by all personnel to avoid injury.

By having the diaphragm normally in the flat position B, arranged to open line 78 when deflected, the device could be made to operate the whistle when the pressure exceeds a certain minimum. Relief valve 80 could then be omitted, if desired. The actuator of FIGURE 1 is easily modified to operate a low or high pressure signal by adjustment of the deflection characteristics of the diaphragm.

The primary differential pressure sensing transducer of FIGURE 12 employs the sensing element as an actutor to operate a fluid pressure regulator. A sensing element similar to that of FIGURE 1 is used, with the single arm 8' having a valve member 75 attached to its end 76. One side of the diaphragm 7 is open via line 9 to the atmosphere, and the other via line 10 to fluid such as a gas in a closed system. The valve member closes a line 78 to a check valve 82. Gas enters the inlet 83 and thence passes into the chamber 84 via the regulator valve 85, leaving at 86.

In operation, so long as pressure is maintained in chamber 84, the diaphragm 7 is kept in the bowed position, and line 78 is closed. Whenever pressure drops below a predetermined minimum, as controlled by the regulator valve, the diaphragm becomes flat, resuming its normal position, and the end 76 of the arm moves to position B, shown in dotted lines. Line 79 is then opened, permitting more gas to enter the chamber through valve 82, which is set to operate at a lower pressure than regulator valve 85. When pressure in chamber 84 is restored to normal, the diaphragm is deflected, and arm 8' closes line 78, preventing the predetermined pressure limit from being exceeded. Thus, the sensing element maintains the pressure in the system within a range of maximum and minimum limits, as desired. The sensing element can be made to operate at any pressure by selection of materials, the size of the diaphragm and the extent of its deflection.

The lever arm 8' can be arranged to operate a valve to release a reserve supply of gas to maintain the pressure in the system whenever it falls below a certain minimum, as in supplying oxygen or anesthetic for therapeutic treatment.

The arm 8' in FIGURES 11 and 12 can be made of relatively thin, spring metal, so as to act in the manner of a detent. As the pressure at the diaphragm decreases, a value is reached at which the arm springs out suddenly, allowing full flow at once from line 78. A mechanical detent can also be provided for the same purpose.

The drawings illustrate only a few of the possible forms of transducers in which the primary differential pressure sensing element of the invention may be employed. The sensing element can in fact be used in any transducer system which is to be actuable in response to a pressure differential between two systems or in two parts of the same system, as will be apparent to those skilled in the art. The sensing means can be of a shape and a sufficient number to meet the particular requirements.

In addition to operating an electric switch or a whistle or a pressure gauge, for example, the sensing element can be used to operate electrical and mechanical analog transmitters. For instance, the sensing means can be used to operate a rheostat by connection to the rheostat slider. It can be used to vary inductance in a coil by attaching one arm, for example, to the central core in a coil, while the other arm is connected externally of the coil, each withdrawing or entering a greater or lesser portion of the coil with deflection of the diaphragm in response to pressure changes. The sensing means can be used to operate a photocell, by moving a blocking means partially or entirely into or away from the path of the light beam to the cell. Two sensing means can be connected respectively to the two plates of a condenser, to vary capacitance in the condenser by varying the distance between the plates with deflection of the diaphragm.

In pneumatic and pressurized systems, the sensing means can be arranged to operate one or several valves, an air nozzle, or a variable orifice transmitter. For example, the sensing element can be arranged to serve as a level indicator or switch.

The sensing element can be used to operate a counting circuit by replacing the pointer of FIGURE 10 by a rotating commutator. The impulses to the brushes can then be counted, and the differential pressure applied to the diaphragm presented in digital form. Many other systems for presenting the output of the sensing in digital form are available commercially.

None of these are shown in the drawings, because their construction is obvious to anyone skilled in this art. All of such systems operated by the sensing element arranged to act as a transducer need not, of course, be described in detail, since these are all well known devices of the prior art, and form no part of the instant invention.

The sensing elements of the invention, as is shown in the preceding description, have numerous advantages. Because the diaphragm is a simple disk, stresses in it can be readily calculated, and the design can then be optimized for a long life without fatigue failure. This is not the case for Bourdon tubes and the usual corrugated diaphragms, capsules and bellows, which can be designed only empirically.

Furthermore, the sensing elements of the invention provide appropriately large deflections of the diaphragm owing to the type of edge support used with the diaphragm. This support is absolutely leakproof against liquids and gases when bonds are used, at pressures up to the breaking strength of the bond or yield point of the material used, and at very high temperatures, up to the softening point of the material used. The V-ring seals used are self-tightening at high pressures, and also are capable of maintaining leakproof and temperature-proof seals practically equivalent to the bonded seals against liquids.

By proper spacing and configuration of the pressure chamber walls, the diaphragm can be fully supported when fully deflected within its stress limit, thus preventing overstressing and overpressuring of the diaphragm.

Thus, the sensing element of the invention provides a high degree of sensitivity, that is, a relatively large motion of the diaphragm for a small pressure differential, that is practically independent of the internal pressure and temperature, while being free from damage due to overpressuring. Owing to the compactness of its construction, the danger of uncontrollable vibration of the element is minimized; it does not have long unsupported portions as does, for example, a Bourdon tube. Moreover, since it directly responds to pressure differentials, it eliminates the need for measuring two pressures with two pressure indicators, and avoids the problems of measuring accurately two high pressures with different indicators. The element is inexpensive, and easily mass-produced, due to the simplicity of construction, with uniformly reproduceable accuracy from device to device.

We claim:

1. A primary differential pressure sensing element comprising a chamber, an elastic pressure-responsive diaphragm across one side thereof, at least one side of the diaphragm being subject to variable fluid pressure, the diaphragm being supported for deflection of a central portion thereof responsive to differences in pressure applied to opposite sides thereof, reinforcing cup means having a flat portion attached to the diaphragm and having a cylindrical portion attached to a wall of the chamber, and sensing means extending laterally from a point adjacent an edge of the diaphragm, responding to pressure-responsive deflection of the central portion of the diaphragm.

2. A primary differential pressure sensing element in accordance with claim 1 in which the sensing means is integral with the diaphragm.

3. A primary differential pressure sensing element in accordance with claim 1 in which the sensing means is an extension of an edge of the diaphragm.

4. A primary differential pressure sensing element in accordance with claim 1 comprising a plurality of sensing means, arranged at opposite sides of the diaphragm.

5. A primary differential pressure sensing element in accordance with claim 1, comprising sensing means having end portions bent at an angle to the portion attached to the diaphragm, converting angular motion at the latter portion into reciprocating motion at the end portions.

6. A primary differential pressure sensing element in accordance with claim 5, comprising a plurality of such sensing means extending from opposite sides of the diaphragm and in the same general direction.

7. A primary differential pressure sensing element in accordance with claim 1, in which the central portion of the diaphragm has a greater thickness than the edge portions thereof.

8. A primary differential pressure sensing element in accordance with claim 7 in which the diaphragm has a grooved portion encircling the thicker portion for controlled angular deflection of the edge.

9. A primary differential pressure sensing element comprising a tube, an elastic pressure sensitive diaphragm extending across and partitioning the tube into two portions, cap means inserted in the tube at least on one side of the diaphragm, the cap means and the diaphragm defining a chamber therebetween, an opening in said cap means for supplying variable pressure fluid to the chamber, the diaphragm being supported at its edges for deflection of a central portion thereof responsive to differences in pressure applied to opposite sides thereof, and sensing means extending laterally from a point adjacent an edge of the diaphragm, transmitting pressure-responsive deflection of the diaphragm, and reinforcing cup means having a cylindrical portion attached to the diaphragm and having a flat portion opposite the diaphragm attached to the cap means.

References Cited in the file of this patent

UNITED STATES PATENTS

| | | |
|---|---|---|
| 1,340,086 | Smith | May 11, 1920 |
| 1,489,349 | Hampton | Apr. 8, 1924 |
| 1,885,457 | Lord et al. | Nov. 1, 1932 |
| 2,034,646 | Baumert et al. | Mar. 17, 1936 |
| 2,078,065 | De Bethune | Apr. 20, 1937 |
| 2,312,787 | Allen | Mar. 2, 1943 |
| 2,517,534 | Courtot | Aug. 8, 1950 |
| 2,902,048 | Ryan | Sept. 1, 1959 |
| 2,904,068 | St. Clair | Sept. 15, 1959 |
| 2,964,062 | Hunt | Dec. 13, 1960 |
| 2,971,470 | Wein et al. | Feb. 14, 1961 |

UNITED STATES PATENT OFFICE
CERTIFICATE OF CORRECTION

Patent No. 3,124,959                                March 17, 1964

David B. Pall et al.

It is hereby certified that error appears in the above numbered patent requiring correction and that the said Letters Patent should read as corrected below.

Column 3, line 74, for "which a function" read -- which is a function --; column 4, lines 49 and 50, for "graduallly" read -- gradually --; column 5, line 51, for "elements" read -- element --; column 6, line 20, after "normally" strike out the comma; line 43, for "strainless" read -- stainless --.

Signed and sealed this 21st day of July 1964.

(SEAL)

Attest:

ESTON G. JOHNSON
Attesting Officer

EDWARD J. BRENNER
Commissioner of Patents